US012785267B2

(12) United States Patent
Dellandrea-Cornet et al.

(10) Patent No.: US 12,785,267 B2
(45) Date of Patent: Nov. 3, 2026

(54) METHOD FOR CONTROLLING THE POINTING OF AN ANTENNA

(71) Applicant: THALES, Meudon (FR)

(72) Inventors: Brice Dellandrea-Cornet, Frejus (FR); Geoffrey Lutz, Montauroux (FR)

(73) Assignee: THALES, Meudon (FR)

( * ) Notice: Subject to any disclaimer, the term of this patent is extended or adjusted under 35 U.S.C. 154(b) by 234 days.

(21) Appl. No.: 18/540,761

(22) Filed: Dec. 14, 2023

(65) Prior Publication Data

US 2024/0204403 A1 Jun. 20, 2024

(30) Foreign Application Priority Data

Dec. 15, 2022 (FR) ....................................... 2213422

(51) Int. Cl.
*H01Q 3/34* (2006.01)
*H01Q 3/26* (2006.01)

(52) U.S. Cl.
CPC ............. *H01Q 3/34* (2013.01); *H01Q 3/2629* (2013.01)

(58) Field of Classification Search
None
See application file for complete search history.

(56) References Cited

U.S. PATENT DOCUMENTS

| | | | | |
|---|---|---|---|---|
| 3,699,324 | A | 10/1972 | Iliff et al. | |
| 4,827,265 | A | 5/1989 | Das et al. | |
| 2018/0192298 | A1* | 7/2018 | Noerpel | H01Q 21/22 |
| 2019/0013566 | A1* | 1/2019 | Merrell | H01Q 1/1257 |

* cited by examiner

*Primary Examiner* — Whitney Moore
(74) *Attorney, Agent, or Firm* — BakerHostetler

(57) ABSTRACT

A method for controlling the pointing of an antenna situated on a platform in the direction of a communications device emitting a reference signal, includes the following steps: S1) apply a first mode of pointing of the antenna using almanac data for the platform and for the communications device so as to obtain an initial position of pointing in azimuth and in elevation of the boresight of the antenna; S2) apply a second mode of pointing of the antenna, comprising at least one scan of the antenna around the initial position so as to point the antenna in a direction that maximizes a received power of the reference signal; S3) apply a third mode of pointing of the antenna wherein at least one triangulation manoeuvre is implemented for pointing the antenna based on the maximum power.

11 Claims, 15 Drawing Sheets

ROTX - +DX/2

ROTX: - DX

ROTY: + DY/2

ROTY: - DY

METHOD FOR CONTROLLING THE POINTING OF AN ANTENNA

CROSS-REFERENCE TO RELATED APPLICATION

This application claims priority to foreign French patent application No. FR 2213422, filed on Dec. 15, 2022, the disclosure of which is incorporated by reference in its entirety.

FIELD OF THE INVENTION

The invention relates to a method and a system for controlling the pointing of an antenna with two pointing axes situated on a platform in the direction of a communications device emitting a reference signal. The invention is applicable in the field of telecommunications and, more particularly, in the field of space telecommunications.

BACKGROUND

The development projects for orbital stations in cis-lunar orbits pose new challenges in terms of space telecommunications. In this type of orbit, the communication distances can be very large. The distance between the gateway of the advanced lunar station and the system in orbit around the moon, or with a fixed or mobile system on the moon, may reach 70,000 km for some missions under development, which represents around twice the distance between the Earth and a satellite in geostationary orbit.

Another problem comes from the fact that, on the orbital stations currently being developed, the sensors and other equipment of the AOCS (for Attitude and Orbit Control System) are located at several metres from the communications system of the advanced lunar station, which may pose problems of coherence of the data frames, accentuated by the onboard vibrations and also by the thermo-elastic deformations due to the differences in temperature.

However, the directional antenna must be correctly oriented in order to allow the communications system to collect sufficient energy on the transmitted signals.

The open-loop pointing systems solely based on the knowledge of the almanac for the target system does not allow a sufficient precision to be obtained for transmitting data at very high rate with the required energy levels.

Closed-loop systems do exist for optimizing this pointing, but they are often based on systems with several RF sources allowing, by differential in gain between these sources, the direction towards which the antenna should be pointed to be detected. The systems with closed-loop feedback control use several RF sources in parallel for the nominal communications system. These systems involving several RF sources and several electronic systems for detection of signals are well adapted for the Earth-based ground stations. In addition to the nominal communications chain, these systems require additional external systems allowing a precise feedback control.

However, in onboard applications (for example for the pointing of an onboard antenna in an orbital station towards a rover, towards a station deployed on the moon or towards a lunar orbiter), the constraints in mass, in cost and in accommodation volume are very tight. Thus, the multi-source systems are too costly and their implementation in onboard applications is difficult to envisage.

A known solution is to use phase-controlled array antennas which allow, by scan, the fast detection of a nominal pointing path. The antennas based on phase-controlled arrays have very reduced gains; however, in the applications targeted, the systems may have a relative movement between two measurement times, which would require the phase-controlled array antenna to be configured for scanning a large region of space. An operation for scan over a wide area with a reduced gain would not be satisfactory for the aforementioned applications.

There accordingly exists a need for a method for controlling the pointing of an antenna, which offers a sufficiently high rate, and which does not need any additional antenna system in order to implement the pointing.

SUMMARY OF THE INVENTION

One subject of the invention is therefore a method for controlling the pointing of an antenna situated on a platform in the direction of a communications device emitting a reference signal, comprising the following steps:

- S1) apply a first mode of pointing of the antenna using almanac data for the platform and for the communications device so as to obtain an initial pointing position in azimuth and in elevation for the boresight of the antenna;
- S2) apply a second mode of pointing of the antenna, comprising at least one scan of the antenna around the initial position so as to point the antenna in a direction that maximizes a received power of the reference signal;
- S3) apply a third mode of pointing of the antenna in which at least one triangulation manoeuvre is implemented for pointing the antenna based on the maximum power.

Advantageously, the second mode of pointing of the antenna comprises a first conical scan of the antenna with a first opening angle, and a second conical scan of the antenna with a second opening angle, the first opening angle being determined as a function of the angular range of the secondary lobes of the antenna radiating pattern, the second opening angle being determined as a function of the angular range of the main lobe of the antenna radiating pattern.

Advantageously, the second mode of pointing of the antenna comprises at least one movement in azimuth and in elevation, in which, for each movement in azimuth and in elevation, a search for maximum power is carried out.

Advantageously, the antenna has a monotonic antenna radiating pattern in the angular space in which the at least one scan of the antenna and the triangulation manoeuvre take place.

Advantageously, the monotonic antenna radiating pattern is obtained by a phase shift between the phase centre of the source of the antenna and the focal point of the reflector/sub-reflector combination.

Advantageously, the reference signal is a pure carrier in the second mode of pointing of the antenna.

Advantageously, the third mode of pointing comprises a step for comparison of the distance between the antenna and the communications device with respect to a threshold, and

- if the distance is greater than the threshold, a new triangulation manoeuvre is implemented;
- if the distance is less than the threshold, the pointing of the antenna is implemented by performing a search for maximum power by at least one movement in azimuth and in elevation.

Advantageously, the triangulation manoeuvre comprises:

- a movement in azimuth of half a "triangulation" increment in one direction, a measurement of the received power, an azimuthal movement of the increment in the opposite direction if the received power is lower than a power measured before the azimuthal movement, or an azimuthal movement of half the increment in the same direction if the received power is higher than the power measured before the movement;

a movement in elevation of half a "triangulation" increment in one direction, a measurement of the received power, a movement in elevation of the increment in the opposite direction if the received power is lower than a power measured before the movement in elevation, or a movement in elevation of half the increment in the same direction if the received power is higher than the power measured before the movement.

Advantageously, the triangulation increment results from a compromise between a precision sought for the calculation of the optimum direction to be targeted and a minimization of an amplitude of the misalignment associated with the triangulation manoeuvre.

Advantageously, the first mode of pointing comprises a command to aim towards the initial position, the command comprising a plurality of angular movements in azimuth and in elevation, each angular movement having a predetermined duration.

Advantageously, the communications device is disposed on a celestial body, and the platform is in orbit around the celestial body.

Advantageously, the drift linked to the relative movement between the platform and the communications device is compensated, in the third mode of pointing, by using the almanac data for the platform and for the communications device.

The invention also relates to a system for controlling the pointing of an antenna situated on a platform and configured for communicating with a communications device emitting a reference signal, the system being configured for:

applying a first mode of pointing of the antenna using almanac data for the platform and for the communications device so as to obtain an initial position in azimuth and in elevation of the boresight of the antenna;

applying a second mode of pointing of the antenna, comprising at least one scan of the antenna around the initial position so as to point the antenna in a direction that maximizes a received power of the reference signal;

applying a third mode of pointing of the antenna in which at least one triangulation manoeuvre is implemented for pointing the antenna based on the maximum power.

BRIEF DESCRIPTION OF THE DRAWINGS

Other features, details and advantages of the invention will become apparent upon reading the description presented with reference to the appended drawings given by way of example.

DETAILED DESCRIPTION

Figure 1:
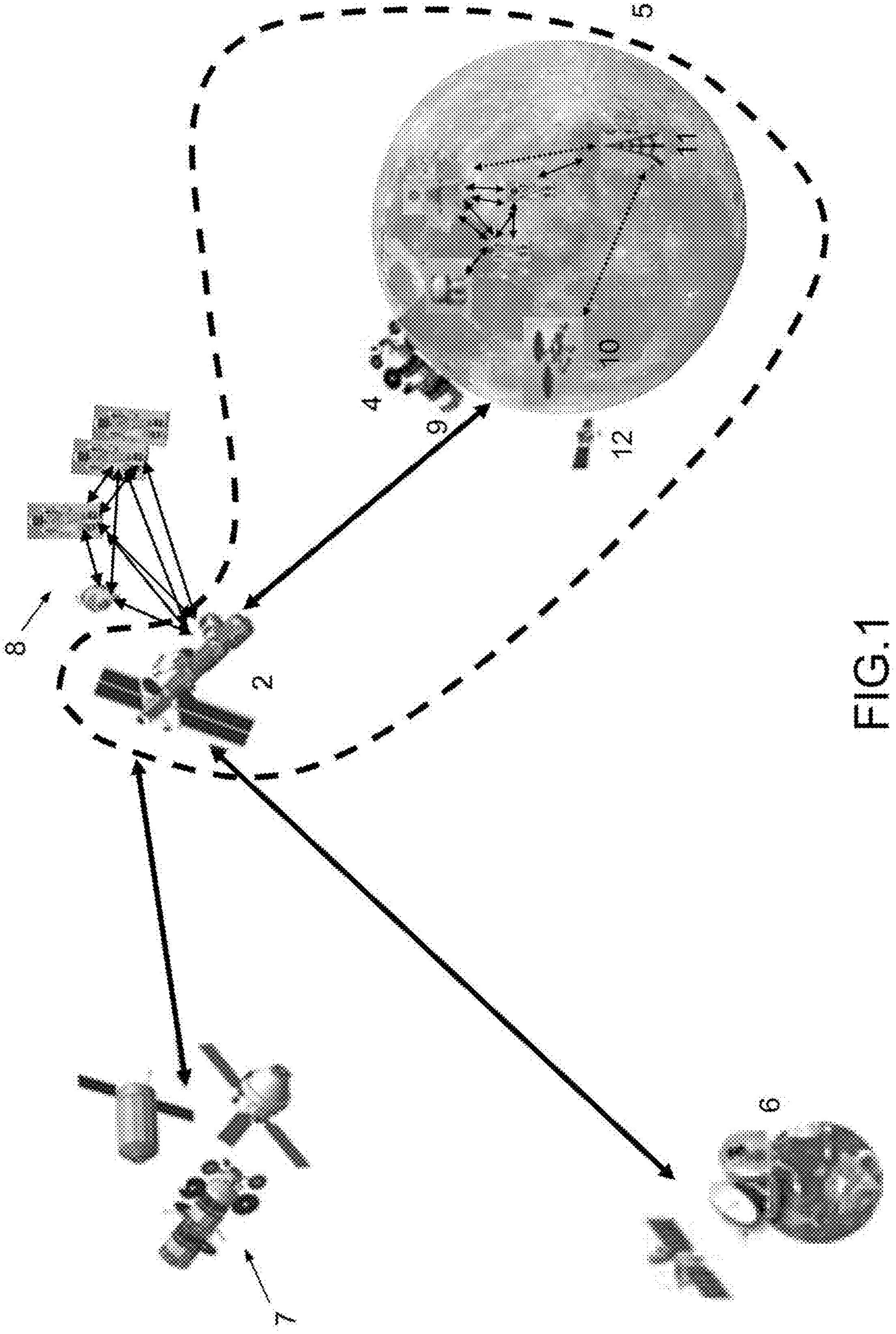
FIG. 1 illustrates one example of a space environment comprising an orbital station in communication with lunar systems.

In FIG. 1, a ground station 6 may be in communication with an orbital station 2, for example in X band for the remote control and the tracking of the orbital station 2 (TTC for Telemetry, Tracking and Control), and in Ka band for the transmission of useful data in upload and download link modes. The orbital station 2 may be in communication with satellites 7, for example in S band, and with communications devices 8 situated close to the orbital station 2 (used for example during extra-vehicular activities for carrying out maintenance operations on the orbital station 2), using for example a short-range wireless network. The orbital station 2 is in communication with a communications device 4 situated on the moon 5 or in orbit around the moon 5, for example in Ka band or in S band. The invention is not limited to one of these frequency bands.

The communications device 4 may be an on-board device, for example, in a lunar station 9 deployed on the ground, in a mobile rover 10 on the moon 5, in a communications station 11 used as a relay on the moon, or else a system 12 in orbit around the moon. In the framework of the invention, it is essential for the communications device 4 to be capable of emitting a reference signal. The reference signal is advantageously a pure carrier, in particular a sinusoidal signal.

Figure 2:
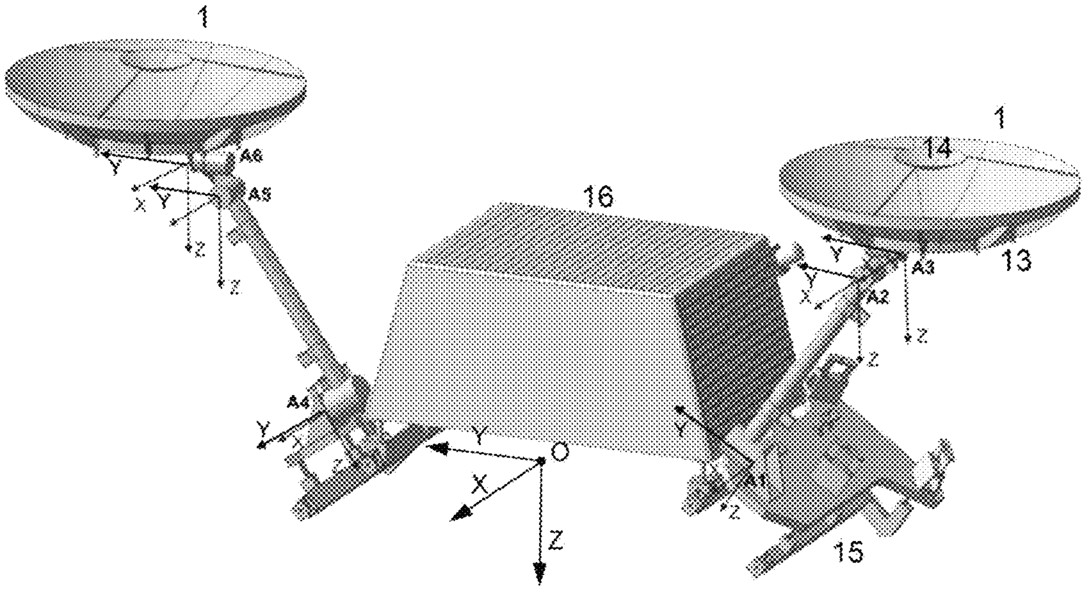
FIG. 2 illustrates one example of an orientation of the reference frame used for the pointing of the antenna.

FIG. 2 illustrates a detailed view of the system of antennas 1 of the orbital station 2. Each antenna 1 may be of the Cassegrain parabolic antenna type, comprising a main reflector 13 and a secondary reflector 14 situated at the focal point of the main reflector 13. The antenna system also comprises a support structure 15, which serves as an interface between the antenna and the platform of the satellite.

A housing 16 allows the various elements interacting with the antenna to be protected, for example:

a transmitter/receiver, coupled to the antenna, and capable of measuring the power level of the received RF signal, a computer, connected to the transmitter/receiver, and capable of interpreting the information received by the transmitter/receiver and of defining a control solution according to a locally defined guidance strategy, a system for controlling the motors of the axes of the antenna, capable of receiving the command from the computer and sending a movement command to the directional antenna.

The housing 16 may also house an external system supplying the computer with a minimum amount of information on the system with which the communication must be established, notably the fundamental RF parameters (frequency, modulation, coding, data rate, cryptographic key, protocol identifiers, etc.), or further the rough position of the target system in order to limit the search space.

The reference frame used for the description is a reference frame linked to the reflector of the antenna, and hence which is mobile as a function of the antenna pointing. The references A1, A2 and A3 allow the respective deployment (A1) motor and pointing (A2 and A3) motors to be identified. As the reference embodiment comprises two antennas, the references A1, A2 and A3 that are applicable to one antenna respectively correspond to the references A4, A5 and A6 on the second antenna.

The reference frame XYZ, whose origin corresponds to the centre of the parabolic reflector, is defined by the following axes:

Z: boresight of the antenna

Y: perpendicular to Z, in the same direction and orientation as the axis of rotation of the motor A3 for the antenna 1 (of the motor A6 for the second antenna 1 in FIG. 2), going through the origin of the reference frame.

X: Completes the orthonormal reference frame.

FIG. 2 illustrates an antenna system comprising two antennas with reflectors, but this representation is non-limiting. The invention could also be implemented with a different number of antennas, without there being any limitation on the type of antenna used. It is however essential for each antenna to be capable of effecting a pointing along two axes.

The control method according to the invention comprises three modes executed one after the other, which allow the pointing to be acquired in closed-loop mode after several steps for searching and converging towards the optimum performance, starting from a wide search space. The pointing is said to be in closed-loop mode because it relies on the emission of a reference signal by the target device.

The first mode of pointing of the antenna 1 is carried out using almanac data for the platform 2 and for the communications device 4. The almanac data are translated into relative position and velocity commands between the platform 2 and the communications device 4 sent to the computer. These commands may be generated for example in real time at a typical frequency of 1 Hz, or in the form of polynomial profiles interpolated over a time segment. The computer then uses these target directions and an estimation of the direction of the boresight of the antenna to calculate an angular increment to be applied by the motors of the pointing mechanism of the antenna. The first mode thus allows a target direction to be locked onto and tracked with a basic precision corresponding to the precision of the almanac data supplied to the computer. Locking on to this direction is a pre-condition for the transition towards the precise pointing modes (referred to as closed-loop modes), and therefore constitutes the initial condition for it.

The boresight of the antenna corresponds to the axis of maximum gain (maximum radiated power) of a directional antenna. For most antennas, the boresight is the axis of symmetry of the antenna. For example, for axially supplied parabolic antennas, the boresight of the antenna is the axis of symmetry of the parabolic antenna and the radiating pattern of the antenna (the main lobe) is symmetrical around the boresight.

Figure 3:
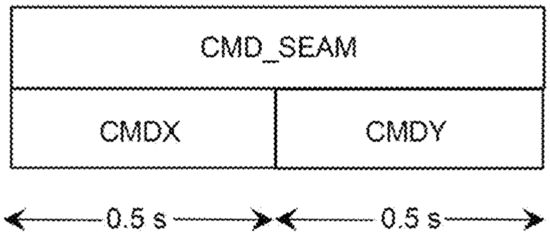
FIG. 3 illustrates a timing chart for the first mode of pointing.

FIG. 3 illustrates one example of a timing chart for the command pattern CMD_SEAM of the first mode of pointing. The pattern is repeated until the antenna boresight points towards the target direction determined by the almanac data. The pattern CMD_SEAM may be decomposed into a command for movement of the boresight along the X axis of the antenna reference frame for a predetermined period of time, followed by a command for moving the boresight along the Y axis of the antenna reference frame for a predetermined period of time. The predetermined period may for example be equal to 0.5 seconds, and the boresight aiming movement may be carried out at a maximum velocity of 1.4 degrees/second. These numerical values depend on the characteristics of the antenna.

The second mode of pointing of the antenna 1 consists in carrying out at least one scan of the antenna 1 around the initial position towards which the antenna points following the first mode of pointing, so as to point the antenna 1 in a direction that maximizes a received power of the reference signal.

Figure 4:
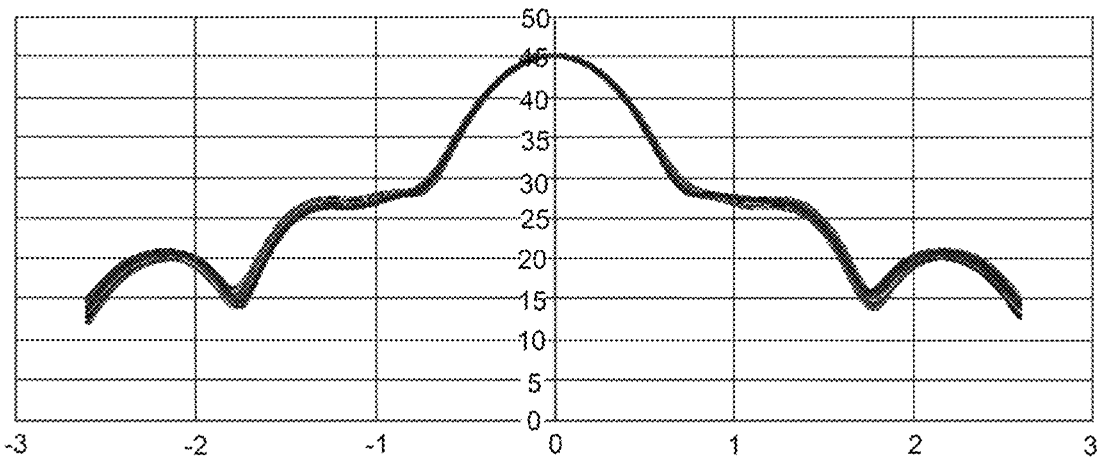
FIG. 4 illustrates one example of a quasi-monotonic antenna radiating pattern in the region of coverage.

In order to associate, without ambiguity, the level of energy received with an angle of misalignment of the antenna, the antenna must dispose of a monotonic pattern within the region of coverage with a maximum gain in the central position corresponding to the boresight, as illustrated on the antenna radiating pattern in FIG. 4.

The term "monotonic pattern" is understood to mean a radiating pattern which is strictly increasing or decreasing around the boresight of the antenna. Thus, over the range of the negative angles, the gain is strictly increasing, and over the range of the positive angles, the gain is strictly decreasing.

In FIG. 4, troughs appear at around −1.8° and 1.8°. Thus, for this antenna, the measurements are carried out within the range of values situated between the troughs.

A completely monotonic antenna pattern allows the control of the pointing to be optimized by precisely associating the setpoint angle with the level of energy received, taking into account a set of interfering elements, amongst which: the measurement noise of the reception level, the instabilities of the remote communications system, the thermo-elastic deformations of the antenna system, of its support and of the motors, the flexible modes of the antenna excited by the control commands, the dynamics of the remote communications system, and the time delays in the measurement, calculation and command chain.

The monotonic pattern is obtained by eliminating the gaps in gain between the first and the second lobes of the antenna pattern, which may be implemented for example via a phase-shift between the phase centre of the source and the focal point of the reflector 13/sub-reflector 14 combination, or for example by optimizing the shape of the reflector for single-reflector antennas according to known techniques.

Figure 5:
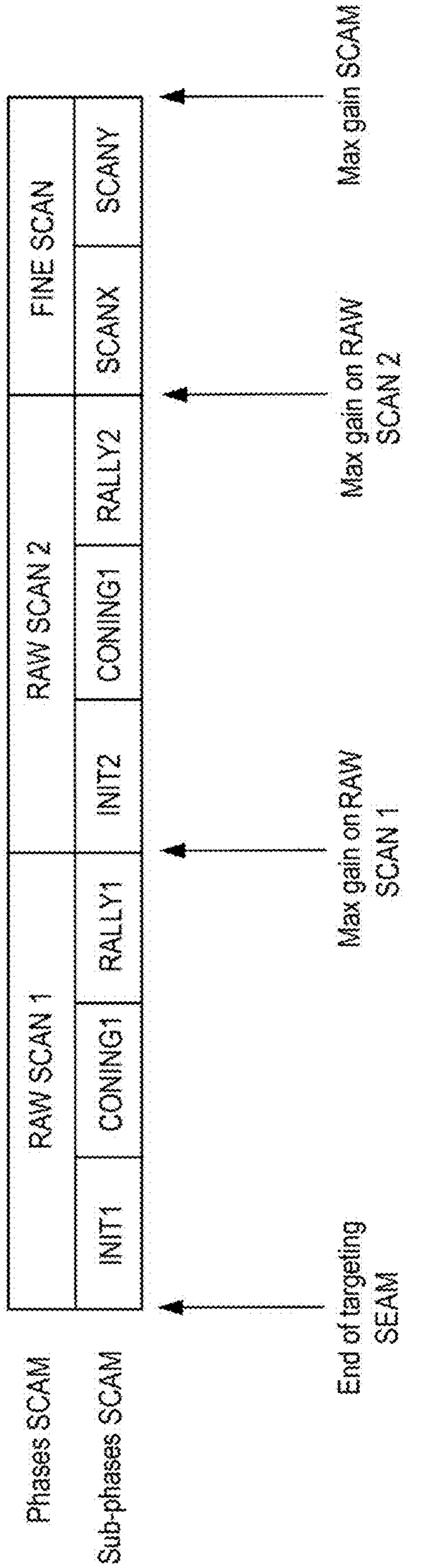
FIG. 5 illustrates a timing chart for the second mode of pointing.

FIG. 5 illustrates one example of a timing chart of the second mode of pointing. In addition to the first conical scan, it comprises a second conical scan, together with a movement in azimuth and in elevation. The second conical scan and the movement in azimuth and in elevation are optional, and allow the operation for aiming towards the position of maximum gain to be refined.

Figure 6A:
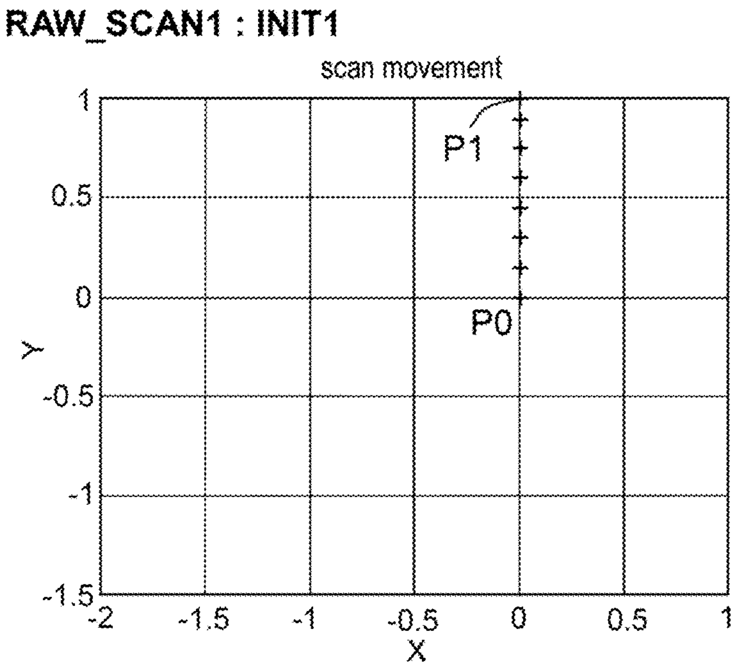
FIGS. 6A-6L illustrate diagrams for controlling the pointing in the XY plane for the second mode of pointing.
Figure 6B:
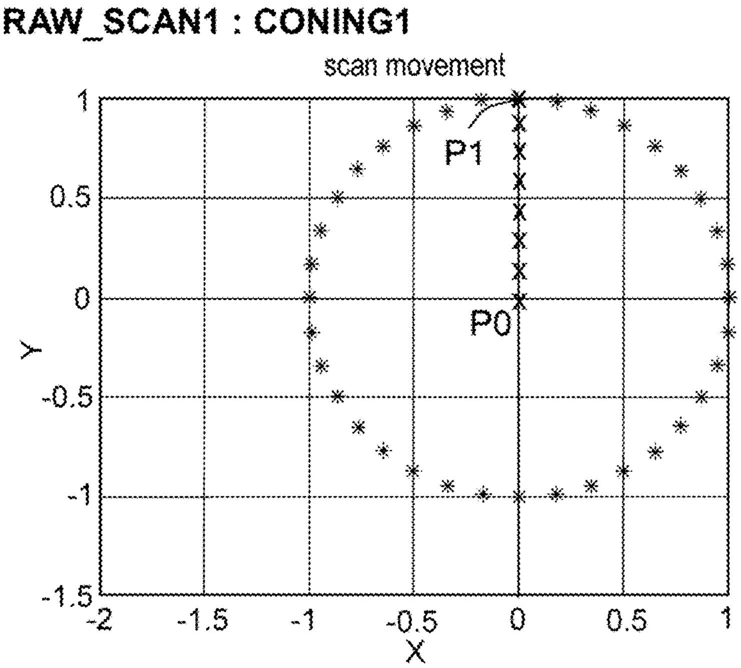
Figure 6C:
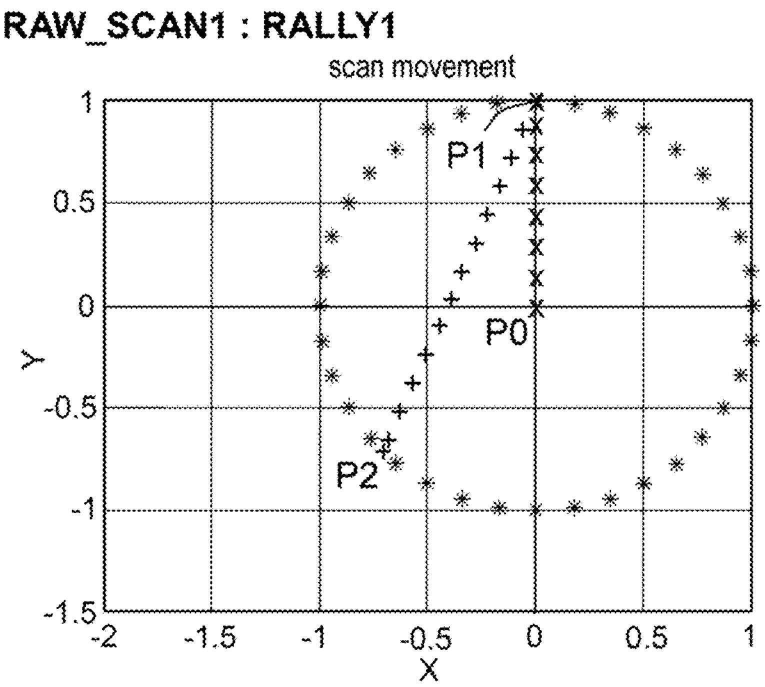

The first conical scan of the antenna 1, illustrated by FIGS. 6A, 6B and 6C, is carried out with a first opening angle which is determined as a function of the angular range of the secondary lobes of the antenna radiating pattern.

In FIG. 6A, the boresight is moved along one of the motor axes of the antenna, namely in elevation or in azimuth, with respect to the initial position P0 supplied by the almanac data from the first mode of pointing towards a position P1. In FIG. 6B, a conical movement is carried out from the position P1, and the gain is measured at regular time intervals. It may be noted that the angular range of the conical scan ([−1°, 1°]) in FIGS. 6A to 6C corresponds substantially to the amplitude of the re-pointing to be carried out in order to reach the main lobe in FIG. 4.

For example, the model of movement of the boresight in the first conical scan may comprise a movement of 0.5 seconds in azimuth (X axis), followed by a movement of 0.5 seconds in elevation (Y axis), and by a measurement delay of the gain of 0.375 seconds. These values are given by way of example, and are non-limiting. At each measurement point, the value of the gain is measured and stored in memory.

Figure 6D:
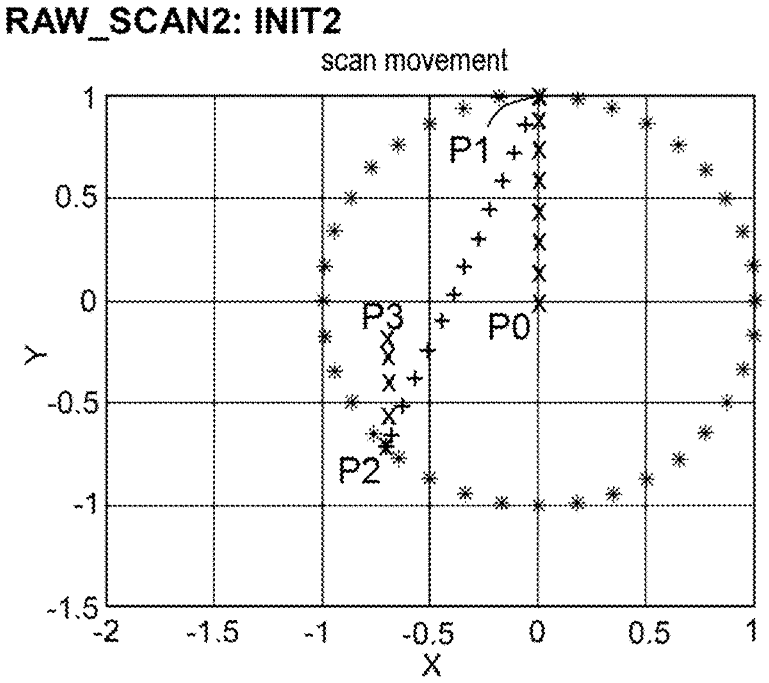
Figure 6E:
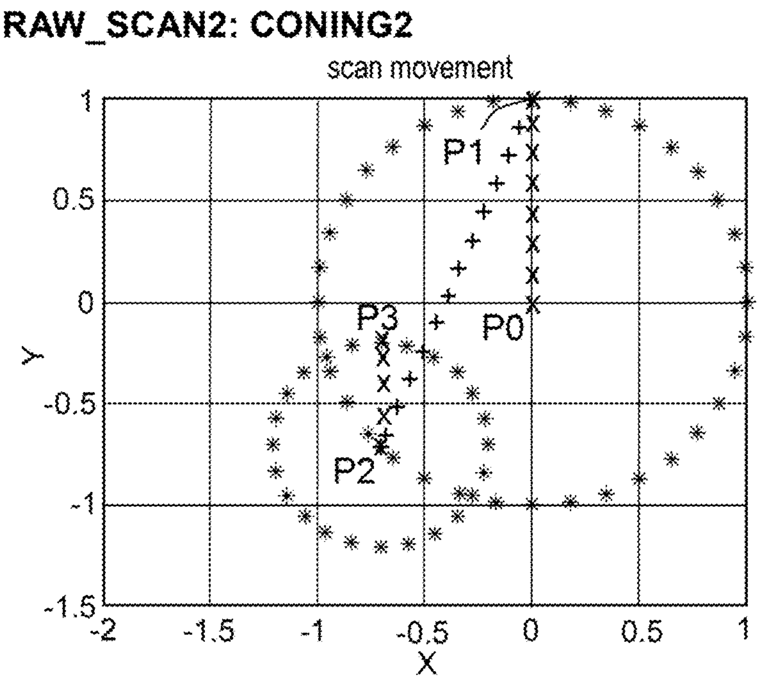

In FIG. 6C, the boresight of the antenna aims to the position P2 which corresponds to the maximum value of the gain. In FIG. 6D, the boresight is moved along one of the motor axes of the antenna, namely in elevation or in azimuth, with respect to the position P2 corresponding to the maximum gain of the first conical scan, towards a position P3. In FIG. 6E, a conical movement is carried out starting from the position P3, and the gain is measured at regular time intervals, in the same way as for the first conical scan. The angular range of the second conical scan is smaller than the angular range of the first conical scan (typically between 0.5° and 1°).

Figure 6F:
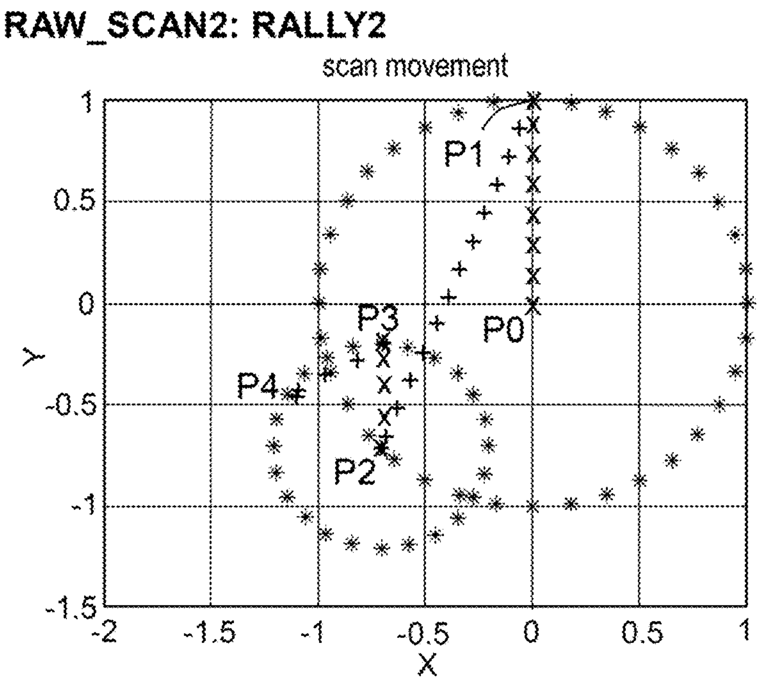

In FIG. 6F, the boresight is misaligned so as to target the position P4 which corresponds to the position from the set of measurements of the second scan which maximizes the gain.

Figure 6G:
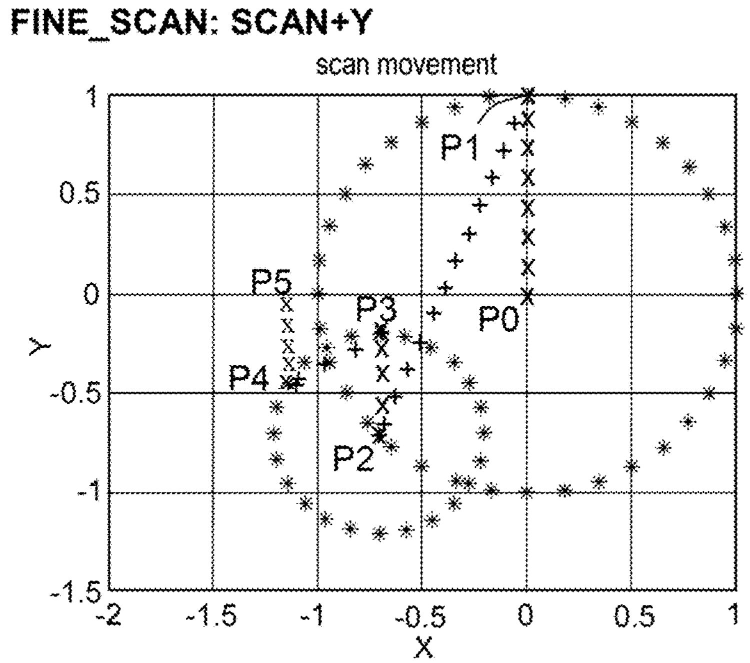

In order to refine the measurement, the second mode of pointing may be completed by a movement in azimuth and in elevation (crossed movement), as is illustrated by FIGS. 6G to 6L. In FIG. 6G, the boresight is moved along one of the motor axes of the antenna (for example elevation in FIG. 6G), as far as a position P5. The movement is carried out until the measured gain decreases. The gain measurements are performed at regular intervals of time.

Figure 6H:
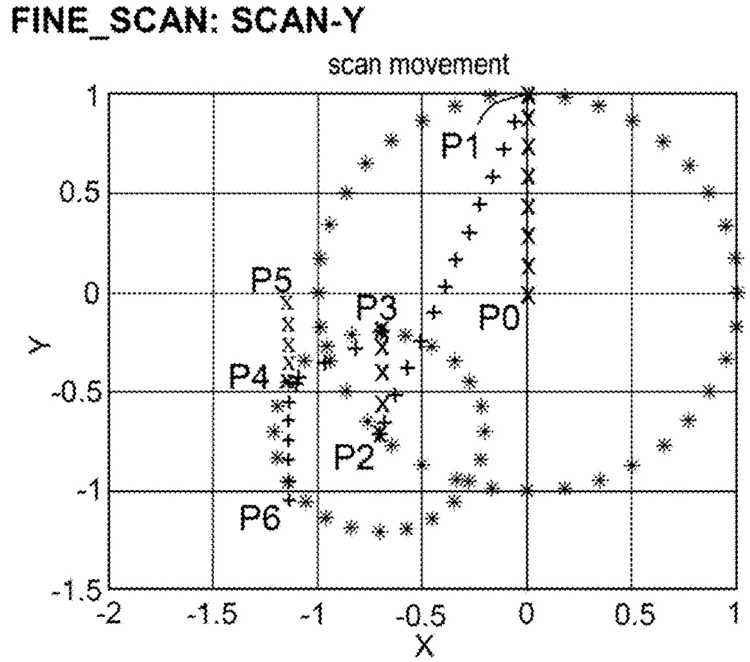
Figure 6I:
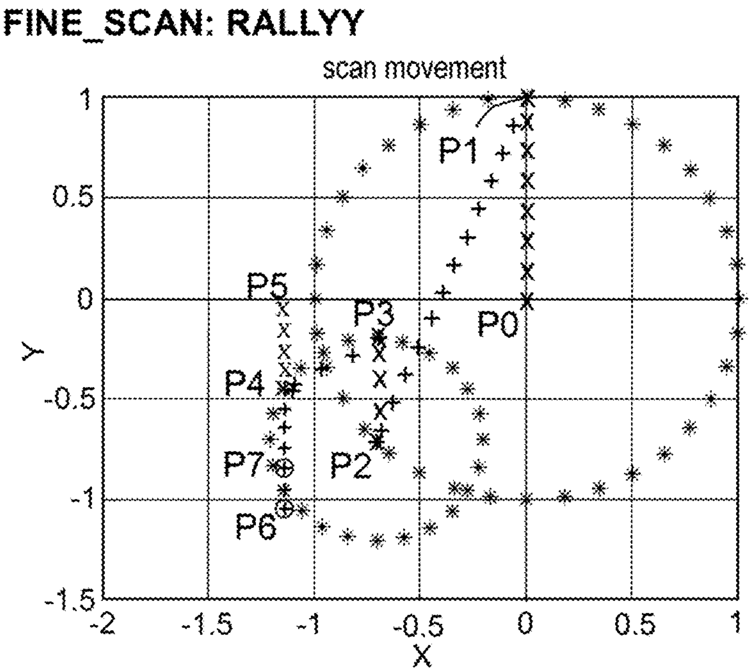

In FIG. 6H, the boresight is moved in the opposite direction with respect to the position P4 as far as a position P6. This movement is triggered when the preceding movement has not detected any increase in gain, and until the measured gain decreases again. The gain is measured at each measurement point, and the position P7 is retained henceforth as being the position that maximizes the measurement of the gain in elevation (FIG. 6I).

Figure 6J:
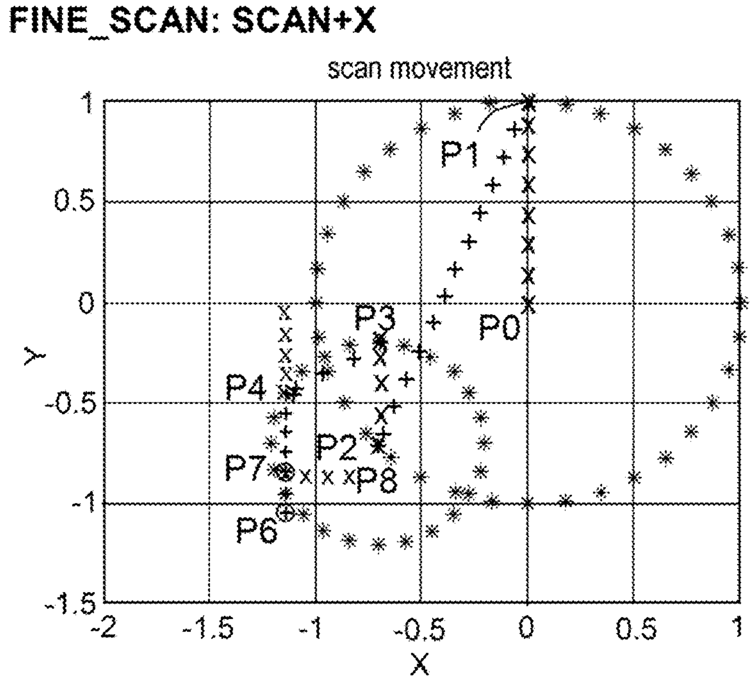
Figure 6K:
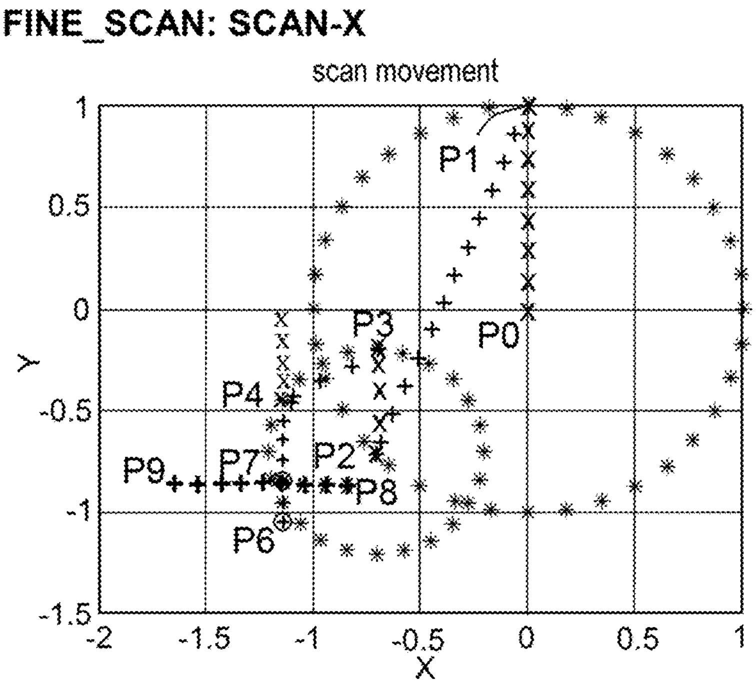
Figure 6L:
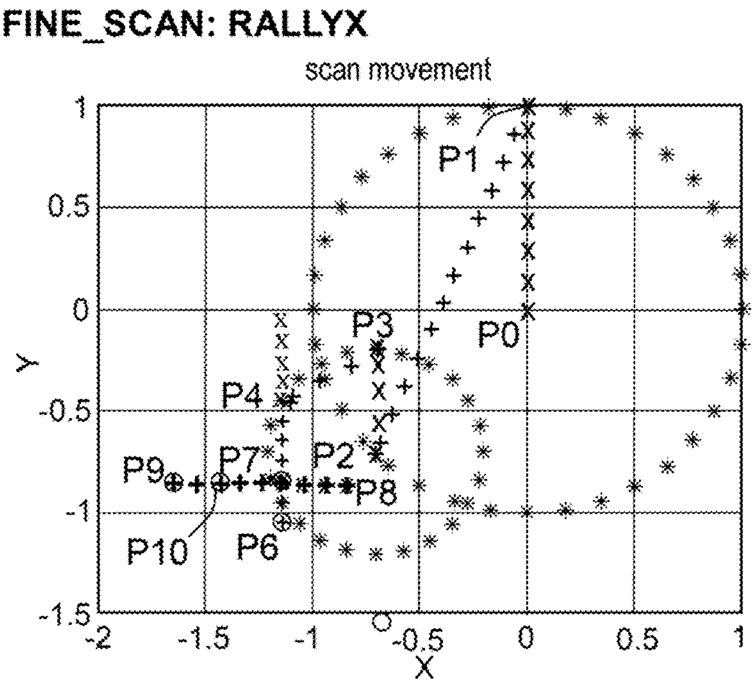

The same procedure is carried out in azimuth (X axis), as is illustrated by FIG. 6J, FIG. 6K, and FIG. 6L. The scan in azimuth starts from the maximum measurement point P7 in elevation. It is finally determined that the point P10 maximizes the measurement of the gain in azimuth.

The use of the two conical scans and of the crossed search mode allows the alternation of phases for activation of the antenna, for softening of the movement and for observation of the new value of the received power in order to update the control profile.

The various steps of the second mode of pointing are illustrated by FIG. 5. The first conical scan RAW SCAN 1 comprises an initialization phase INIT1, a scan phase CONING1, and a targeting phase RALLY1. The second conical scan RAW SCAN 2 comprises an initialization phase INIT2, a scan phase CONING2, and a targeting phase RALLY2. The fine scan in crossed mode comprises various sequences of scan in azimuth SCANX and of scan in elevation SCANY.

The method according to the invention comprises a third mode of pointing of the antenna 1 in which at least one triangulation manoeuvre is implemented for re-pointing the antenna 1 based on the maximum power.

The starting position of the antenna corresponds to the position determined in the second mode of pointing, which maximizes a received power of the reference signal (point P10 in FIG. 6L).

Figure 7:
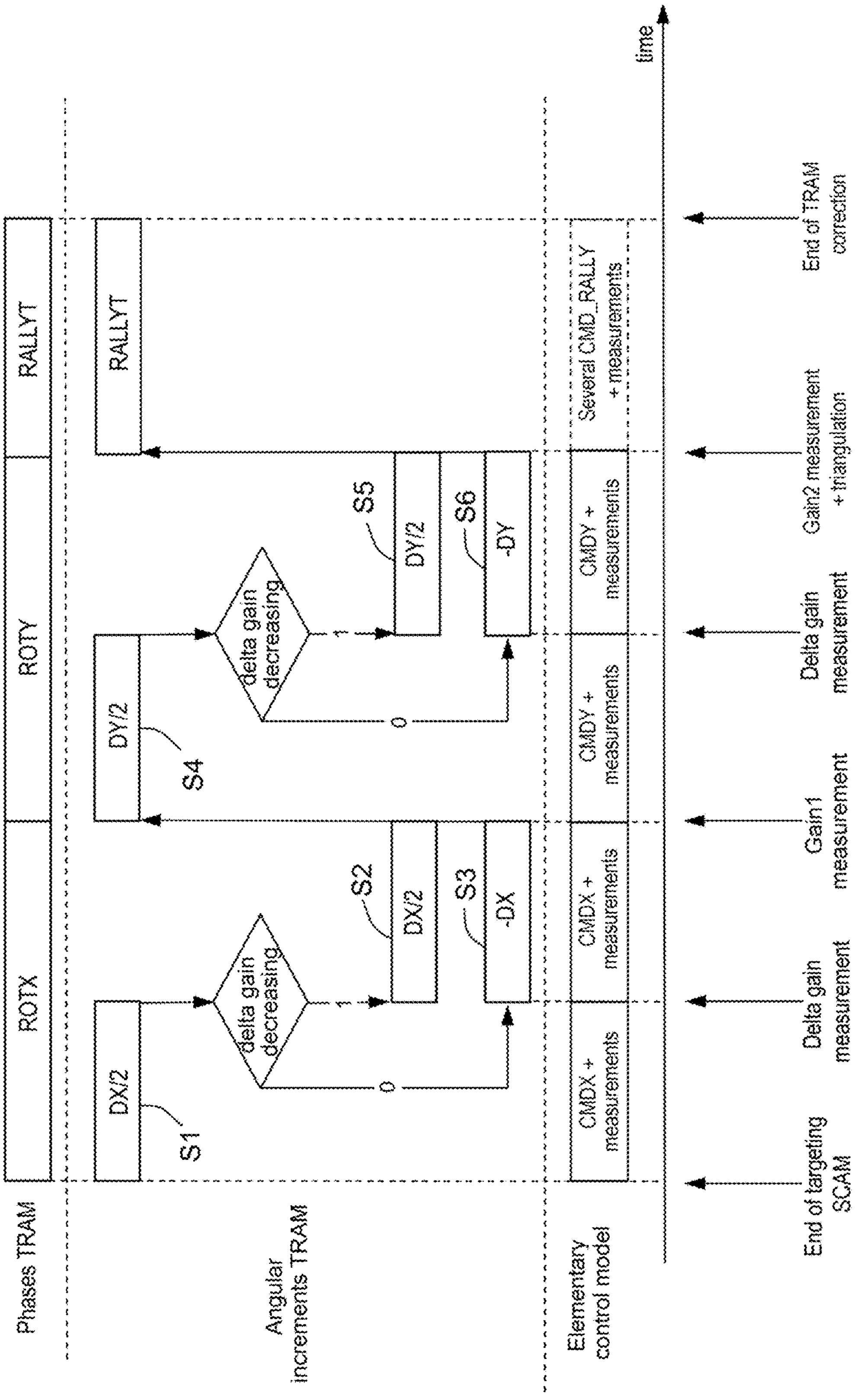
FIG. 7 illustrates a timing chart for the third mode of pointing.

A first step of the third mode of pointing consists in applying a command for moving the boresight in azimuth and in elevation, according to a manoeuvre illustrated by FIG. 7.

The pointing error is subsequently estimated using the knowledge of the antenna pattern, the current measurement of the received power and the estimation of the power emitted by the target obtained based on the maximum power measured in the final position P10 of the scan phase which minimizes the misalignment with respect to this target.

When the estimated pointing error exceeds a predetermined threshold corresponding to the control dead zone, the boresight is moved in azimuth by half a triangulation angular increment DX in one direction (FIG. 7, step S1, movement DX/2). The triangulation angular increment results from a compromise between the precision sought for the calculation of the optimum direction to be targeted (solution to the triangulation problem) and the amplitude of the misalignment associated with the triangulation manoeuvre which must be minimized. The gain is measured, and if the gain is increasing with respect to the preceding measurement effected at the end of the second mode of pointing, the boresight is once again moved in azimuth by half the triangulation increment in the same direction (FIG. 7, step S2). Conversely, the boresight is moved in azimuth by the increment in the opposite direction if the received power has decreased with respect to the preceding measurement effected at the end of the second mode of pointing (FIG. 7, step S3, movement −DX). This logic allows the pointing error to be minimized during the triangulation manoeuvre. Following the steps S2 or S3, the gain GAIN1 is stored in memory. In FIG. 7, the value "deltaGain" corresponds to the difference between the power measured at the current position and the estimated maximum power in the scan phase. So, if the deltaGain increases, the gain decreases.

The same command is subsequently carried out in elevation, starting from the point for which the azimuthal movement procedure finished following steps S2 or S3. The boresight is moved in elevation by half a triangulation increment in one direction (FIG. 7, step S4, movement DY/2). The gain is measured, and if the gain is increasing with respect to the preceding measurement performed at the end of the second mode of pointing, the boresight is once again moved in elevation by half the predetermined increment in the same direction (FIG. 7, step S5). Conversely, the boresight is moved in elevation by the increment in the opposite direction if the received power has decreased with respect to the preceding measurement carried out following the azimuthal movement in the third mode of pointing (FIG. 7, step S6, movement −DY). Following steps S5 or S6, the gain GAIN2 is stored in memory. This two-step triangulation procedure allows the misalignment of the antenna with respect to the direction of interest (which maximizes the received gain) to be minimized.

FIGS. 8A to 8E illustrate one example of the various movement steps for the third mode of pointing of the antenna.

Figure 8A:
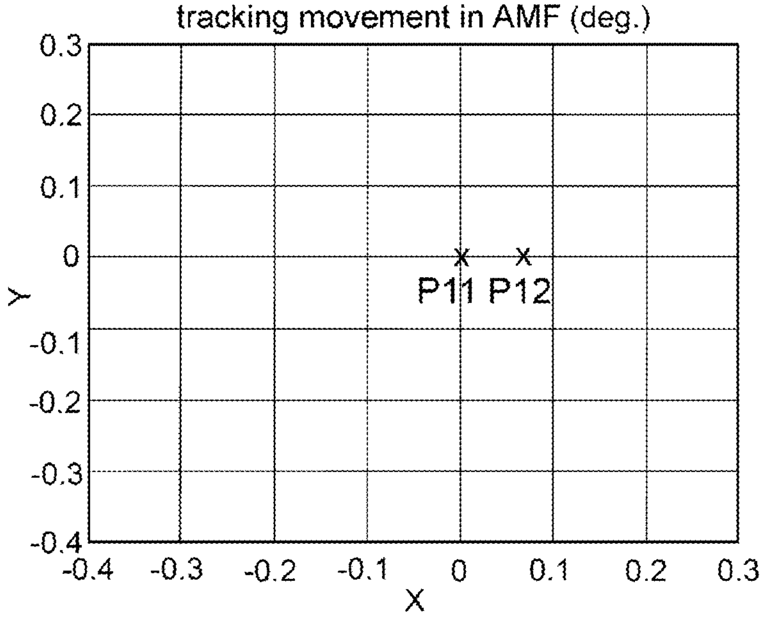
FIGS. 8A-8E illustrate diagrams for controlling the pointing in the XY plane for the third mode of pointing.
Figure 8B:
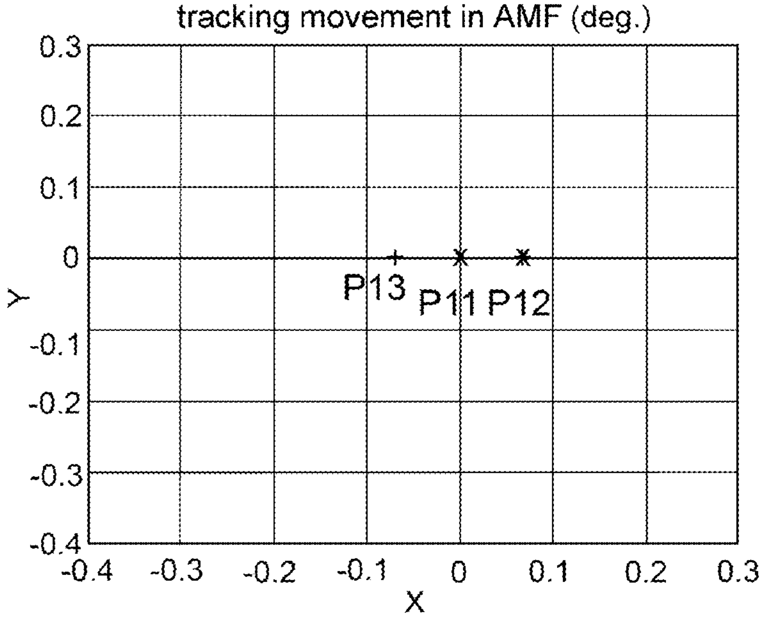

In FIG. 8A, the point P11 corresponds to the references in azimuth and in elevation at the moment when the estimated pointing error comes out of the control dead zone (threshold from which a command for correction of the pointing is generated). The boresight is moved in azimuth by a value DX/2, as far as the point P12. The gain is decreasing between the points P11 and P12, hence the boresight is moved in azimuth by −DX, as far as the point P13 (FIG. 8B).

Figure 8C:
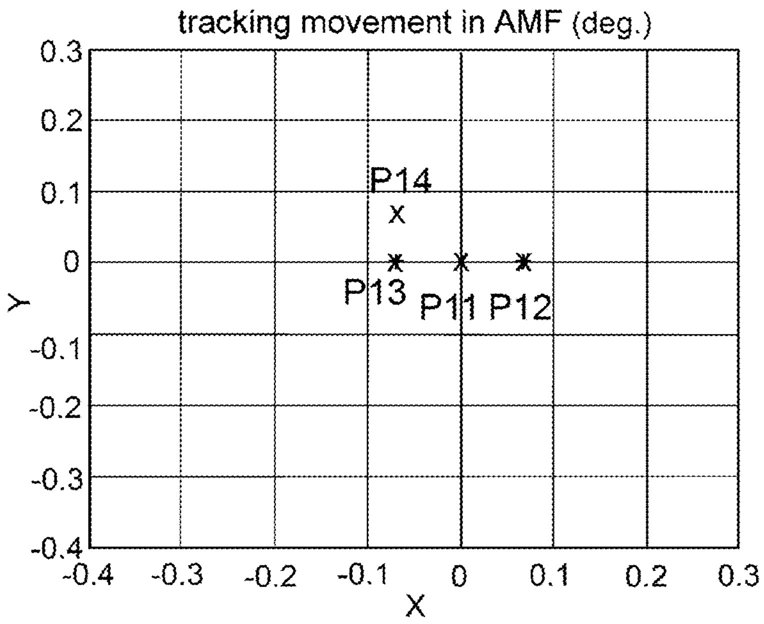
Figure 8D:
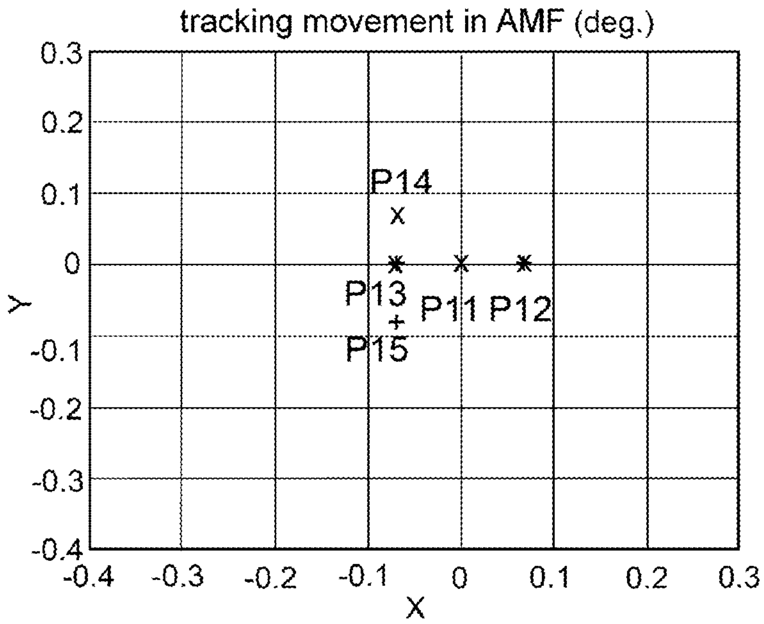

In the same way, in FIG. 8C, the boresight is moved in elevation by a value DY/2, as far as the point P14. The gain is decreasing between the points P13 and P14, hence the boresight is moved in elevation by −DY, as far as the point P15 (FIG. 8D).

The invention could also be implemented by firstly performing the movement in elevation, then the azimuthal movement, for the third mode of pointing.

The calculation of the optimum point to be targeted is subsequently implemented starting from the point P15 by calculating the solution to the triangulation problem based on the measurements carried out during the triangulation manoeuvre previously described. For the example of triangulation manoeuvre illustrated in FIGS. 8A, 8B, 8C, 8D, the measurements used for this calculation are the points P12, P13, P14 and P15. In the example illustrated in FIG. 8E, the solution to the triangulation problem is the point P16, and corresponds, to the first order, to the correction of the control dead zone represented by the circle in FIG. 8E, and below which no pointing correction command is applied.

Figure 8E:
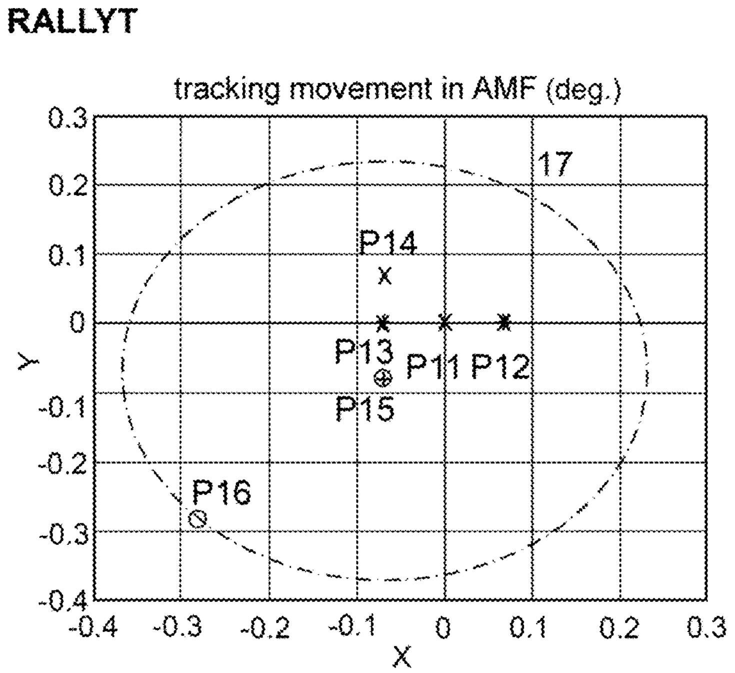
Figure 9:
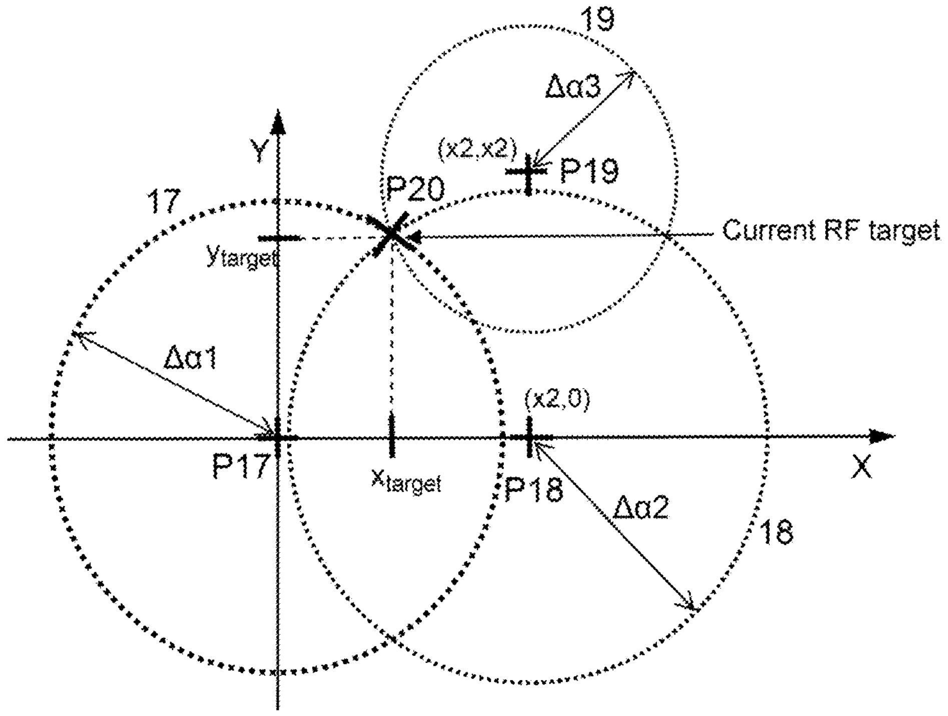
FIG. 9 illustrates the principle of triangulation.
Figure 10:
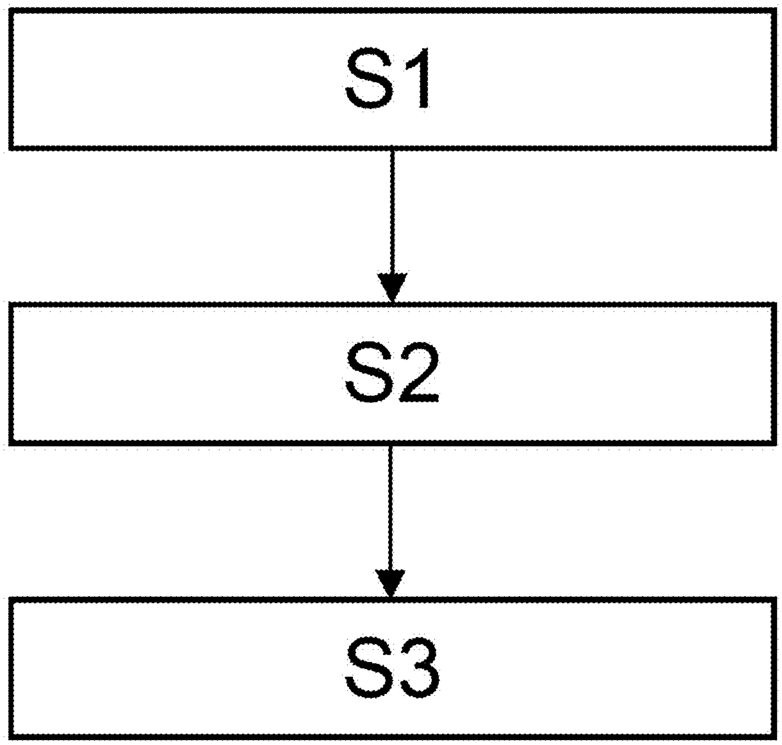
FIG. 10 illustrates the various steps of the method according to the invention.

FIG. 9 illustrates the principle of triangulation applied to the method according to the invention for a triangulation manoeuvre simplified with respect to that illustrated by FIG. 8E. This simplified manoeuvre is triggered when the estimated misalignment of the antenna with respect to the target direction exceeds a performance threshold, and starts from an initial triangulation position P17, corresponding to the antenna position locked onto in the preceding mode of pointing or during the last antenna position correction made in the current mode of pointing. This position is no longer optimal at the time when a new triangulation is initiated because the power measured at this point is lower than the maximum power observed and locked onto in the preceding mode of pointing or in the preceding correction sequence in the current mode of pointing. In FIG. 9, the antenna position corresponding to this maximum power observed has drifted at P20 owing to the relative movements of the pursuing system and of the target. The misalignment at P17 ($\Delta\alpha$1) is estimated using the antenna radiating pattern and the measured power differential between the maximum power observed in the preceding mode of pointing (P20) and the power measured at the point P17. The optimum point P20 is then located on the circle with centre P17 and with radius $\Delta\alpha$1.

Following the azimuthal movement previously described (FIGS. 8A and 8B), the target point P20 is located on a second circle 18, with centre P18 and of known radius $\Delta\alpha$2 corresponding to the misalignment estimated at P18 based on the antenna radiating pattern and on the measured power differential between the maximum power observed in the preceding mode of pointing and the power measured at the point P18.

In the same way, following the movement in elevation previously described (FIGS. 8C and 8D), the target point P20 is located on a third circle 19 having a third known radius $\Delta\alpha$3 and determined as a function of the radiating pattern of the antenna.

The solution to the triangulation problem may be calculated by the intersection P20 of the first circle 17, of the second circle 18 and of the third circle 19. The boresight is subsequently aimed in the direction of the point P20.

The power measurements P17, P18 and P19 allow the angular misalignments D$\alpha$1, D$\alpha$2, D$\alpha$3 to be estimated at these points with respect to the optimum point to be targeted (P20). The solution to the triangulation problem corresponds to the intersection of the three circles with radii D$\alpha$1, D$\alpha$2, D$\alpha$3.

The triangulation manoeuvre advantageously allows a precise measurement to be carried out even in the case of a relative movement between the antenna and the communications device 4, caused for example by the orbital dynamics of the platform of the antenna and/or of the support of the communications device 4, after the second mode of pointing has been carried out.

When the distance between the antenna 1 and the communications device 4 is too short, the transmitter/receiver and the computer typically lower the level of the received signal in order to avoid damaging the components of the receiver chain (a technique known as "clamping"). This could interfere with the triangulation operation by falsifying the received levels.

In order to avoid this, the third mode of pointing is used for distances between the platform 2 and the communications device 4 of less than an adjustable threshold, corresponding to the distance below which the communications device 4 reduces its emitted power (clamping). The knowledge of distance is contained in the almanac data delivered by the platform 2 to the computer. Thus, if the distance is greater than the threshold, a new triangulation manoeuvre is implemented. If the distance is less than the threshold, the re-pointing of the antenna 1 based on the maximum power is implemented by carrying out a search for maximum power by at least one movement in azimuth and in elevation.

In the two modes of pointing described, the drift linked to the relative movement between the platform 2 and the communications device 4 is compensated by using the almanac data for the platform 2 and for the communications device 4. The angular increment commanded thus corresponds to the angular increment for performing the manoeuvre in the antenna reference frame for each of the pointing phases previously described, to which is added an increment allowing the drift of the target during this manoeuvre to be compensated. This drift is estimated based on the relative positions and velocities between the target and the pointing device, contained in the almanac data delivered to the computer.

The method according to the invention allows a closed-loop single-source pointing to be implemented which, for the reference embodiment, allows it to go from an open-loop precision of around 1.6° to a closed-loop precision of around 0.3°. The antenna gain is considerably improved as a consequence and the rates achievable go from 100 ksps to 50 Msps.

Furthermore, the system used to find the optimum boresight pointing is the same as that used for the communication.

Lastly, if, in the reference embodiment, the communications device 4 is operated in open-loop mode, it is possible to also implement a closed-loop pointing on this device by ensuring that the pointing performance of this system is taken into account in order to guarantee the stability of the communication.

The invention claimed is:

1. A method for controlling the pointing of an antenna situated on a platform in the direction of a communications device emitting a reference signal, comprising the following steps:

S1) applying a first mode of pointing of the antenna using almanac data for the platform and for the communications device so as to obtain an initial pointing position in azimuth and in elevation for the boresight of the antenna;

S2) applying a second mode of pointing of the antenna, comprising at least one scan of the antenna around the initial position so as to point the antenna in a direction that maximizes a received power of the reference signal; and S3) applying a third mode of pointing of the antenna wherein at least one triangulation manoeuvre is implemented for pointing the antenna based on the maximum power, wherein the antenna has a monotonic antenna radiating pattern in the angular space wherein the at least one scan of the antenna and the triangulation manoeuvre take place, and wherein the monotonic antenna radiating pattern is obtained by a phase-shift between the phase centre of the source of the antenna and the focal point of the reflector/sub-reflector combination.

2. The method according to claim 1, wherein the second mode of pointing of the antenna comprises a first conical scan of the antenna with a first opening angle, and a second conical scan of the antenna with a second opening angle, the first opening angle being determined as a function of the angular range of the secondary lobes of the antenna radiating pattern, the second opening angle being determined as a function of the angular range of the main lobe of the antenna radiating pattern.

3. The method according to claim 1, wherein the second mode of pointing of the antenna comprises at least one movement in azimuth and in elevation, wherein, for each movement in azimuth and in elevation, a search for maximum power is carried out.

4. The method according to claim 1, wherein the reference signal is a pure carrier in the second mode of pointing of the antenna.

5. The method according to claim 1, wherein the first mode of pointing comprises a command to aim towards the initial position, the command comprising a plurality of angular movements in azimuth and in elevation, each angular movement having a predetermined duration.

6. The method according to claim 1, wherein the communications device is disposed on a celestial body, and the platform is in orbit around the celestial body.

7. The method according to claim 1, wherein the drift linked to the relative movement between the platform and the communications device is compensated, in the third mode of pointing, using the almanac data for the platform and for the communications device.

8. A method for controlling the pointing of an antenna situated on a platform in the direction of a communications device emitting a reference signal, comprising the following steps:

S1) applying a first mode of pointing of the antenna using almanac data for the platform and for the communications device so as to obtain an initial pointing position in azimuth and in elevation for the boresight of the antenna;

S2) applying a second mode of pointing of the antenna, comprising at least one scan of the antenna around the initial position so as to point the antenna in a direction that maximizes a received power of the reference signal; and S3) applying a third mode of pointing of the antenna wherein at least one triangulation manoeuvre is implemented for pointing the antenna based on the maximum power, wherein the third mode of pointing comprises a step for comparison of the distance between the antenna and the communications device with respect to a threshold, and if the distance is greater than the threshold, a new triangulation manoeuvre is implemented;

if the distance is less than the threshold, the pointing of the antenna is implemented by carrying out a search for maximum power by at least one movement in azimuth and in elevation.

9. A method for controlling the pointing of an antenna situated on a platform in the direction of a communications device emitting a reference signal, comprising the following steps:

S1) applying a first mode of pointing of the antenna using almanac data for the platform and for the communications device so as to obtain an initial pointing position in azimuth and in elevation for the boresight of the antenna;

S2) applying a second mode of pointing of the antenna, comprising at least one scan of the antenna around the initial position so as to point the antenna in a direction that maximizes a received power of the reference signal; and S3) applying a third mode of pointing of the antenna wherein at least one triangulation manoeuvre is implemented for pointing the antenna based on the maximum power, wherein the triangulation manoeuvre comprises:

an azimuthal movement of half a triangulation increment in one direction, a measurement of the received power, an azimuthal movement of the increment in the opposite direction if the received power is lower than a power measured before the azimuthal movement, or an azimuthal movement of half the increment in the same direction if the received power is higher than the power measured before the movement;

a movement in elevation of half a triangulation increment in one direction, a measurement of the received power, a movement in elevation of the increment in the opposite direction if the received power is lower than a power measured before the movement in elevation, or a movement in elevation of half the increment in the same direction if the received power is higher than the power measured before the movement.

10. The method according to claim 9, wherein the triangulation increment results from a compromise between a precision sought for the calculation of the optimum direction to be targeted and a minimization of an amplitude of the misalignment associated with the triangulation manoeuvre.

11. The method according to claim 9, wherein, in the case of a relative movement between the antenna and the communications device following the second mode of pointing:

the triangulation manoeuvre is triggered when the estimated misalignment of the antenna with respect to the target direction exceeds a performance threshold, and departs from an initial triangulation position, corresponding to the antenna position locked onto in the preceding mode of pointing or during the latest correction of antenna position effected in the current mode of pointing, the misalignment ($\Delta\alpha\mathbf{1}$) in the initial triangulation position being estimated from the antenna radiating pattern and from the power differential measured between the maximum power observed in the preceding mode of pointing and the power measured at the point of the initial triangulation position, the target point being located on the circle having as centre the initial triangulation position and a radius corresponding to the misalignment ($\Delta\alpha\mathbf{1}$);

following the azimuthal movement, the target point is located on a second circle, with a centre determined by the triangulation increment and a known radius ($\Delta\alpha\mathbf{2}$) corresponding to the misalignment estimated at the centre of the second circle from the antenna radiating pattern and from the power differential measured between the maximum power observed in the preceding mode of pointing and the power measured at the centre of the second circle;

following the movement in elevation, the target point is located on a third circle with a centre determined by the triangulation increment and with a third known radius ($\Delta\alpha\mathbf{3}$) corresponding to the misalignment estimated at the centre of the third circle from the antenna radiating pattern and from the power differential measured between the maximum power observed in the preceding mode of pointing and the power measured at the centre of the third circle;

the solution to the triangulation problem being calculated by the intersection of the first circle, of the second circle and of the third circle, the boresight is subsequently aimed in the direction of the point of intersection.

* * * * *